US012719548B2

(12) United States Patent
Haslinger et al.

(10) Patent No.: US 12,719,548 B2
(45) Date of Patent: Aug. 25, 2026

(54) LOCALIZATION SYSTEM AND OPERATING METHOD

(71) Applicant: NXP B.V., Eindhoven (NL)

(72) Inventors: Dorian Haslinger, Nestelbach bei Graz (AT); Wolfgang Eber, Graz (AT); David Veit, Graz (AT); Filippo Casamassima, Thal (AT)

(73) Assignee: NXP B.V., Eindhoven (NL)

( * ) Notice: Subject to any disclaimer, the term of this patent is extended or adjusted under 35 U.S.C. 154(b) by 274 days.

(21) Appl. No.: 18/066,366

(22) Filed: Dec. 15, 2022

(65) Prior Publication Data

US 2023/0231613 A1 Jul. 20, 2023

(30) Foreign Application Priority Data

Jan. 20, 2022 (EP) .................................... 22152546

(51) Int. Cl.
*H04B 7/06* (2006.01)

(52) U.S. Cl.
CPC ......... *H04B 7/0691* (2013.01); *H04B 7/0632* (2013.01)

(58) Field of Classification Search
CPC ...... H04B 7/06; H04B 7/0691; H04B 7/0632; H04B 7/0802; H04B 7/0608
See application file for complete search history.

(56) References Cited

U.S. PATENT DOCUMENTS 5,561,673 A 10/1996 Takai et al.
6,327,481 B1 12/2001 Nagashima
7,366,139 B2 4/2008 Poegel et al.
8,531,337 B2 9/2013 Castany et al.
9,961,600 B2 5/2018 Gopal et al.
(Continued)

FOREIGN PATENT DOCUMENTS

KR 19990009325 A 2/1999
KR 100270227 B1 10/2000

OTHER PUBLICATIONS

Razvan Mocanu and Alexandru Onea, “Indoor and Outdoor Vehicle Localization using UWB Transceivers”, 2019 27th Mediterranean Conference on Control and Automation (MED), Aug. 15, 2019). (Year: 2019).*

(Continued)

*Primary Examiner* — Aristocratis Fotakis

(57) ABSTRACT

In accordance with a first aspect of the present disclosure, a localization system is provided, comprising: a plurality of ultra-wideband (UWB) communication nodes; a plurality of antennas, each one of said antennas being included in one of said UWB communication nodes; an antenna selection unit configured to select a subset of said antennas for use in ranging operations that output a position estimate of an external device; wherein the antenna selection unit is configured to select said subset in dependence on at least one previous ranging operation. In accordance with a second aspect of the present disclosure, a corresponding method of operating a localization system is conceived. In accordance with a third aspect of the present disclosure, a computer program is provided, comprising computer-executable instructions that, when executed by a localization system, cause said localization system to carry out a method of the kind set forth.

20 Claims, 3 Drawing Sheets

(56) References Cited

U.S. PATENT DOCUMENTS

| | | | |
|---|---|---|---|
| 10,033,114 | B2 | 7/2018 | Pros et al. |
| 10,207,678 | B2 | 2/2019 | Khan et al. |
| 10,440,650 | B2 | 10/2019 | Clevorn |
| 11,973,551 | B2 | 4/2024 | Haslinger et al. |
| 12,255,712 | B2 | 3/2025 | Casamassima et al. |
| 2009/0323872 | A1 | 12/2009 | Haller |
| 2012/0087431 | A1 | 4/2012 | Liu et al. |
| 2013/0051258 | A1 | 2/2013 | Huang et al. |
| 2014/0273866 | A1 | 9/2014 | Swaminathan et al. |
| 2018/0234797 | A1* | 8/2018 | Ledvina .................. B60R 25/24 |
| 2020/0304185 | A1* | 9/2020 | Tsai ..................... H04B 7/0802 |
| 2021/0058744 | A1 | 2/2021 | Padaki et al. |
| 2021/0199755 | A1* | 7/2021 | Emadi ....................... G01S 7/03 |
| 2021/0302528 | A1* | 9/2021 | Wang ........................ G01S 3/46 |
| 2022/0001836 | A1 | 1/2022 | Baek et al. |
| 2022/0291374 | A1* | 9/2022 | Ryu ....................... H01Q 23/00 |
| 2023/0016260 | A1* | 1/2023 | Han ........................ H04W 4/48 |

OTHER PUBLICATIONS

Brahmi, I., “A Fuzzy Logic Approach for Improving the Tracking Accuracy in Indoor Localisation Applications”, 2018 Wireless Days (WD), Apr. 3-5, 2018.

EP application No. 22167808.9, filed on Apr. 12, 2022, entitled “Communication Device and Method of Operation”.

U.S. Appl. No. 17/658,945, filed Apr. 12, 2022, entitled “Communication Device and Operating Method”.

* cited by examiner

LOCALIZATION SYSTEM AND OPERATING METHOD

CROSS-REFERENCE TO RELATED APPLICATIONS

This application claims the priority under 35 U.S.C. § 119 of European Patent application no. 22152546.2, filed on 20 Jan. 2022, the contents of which are incorporated by reference herein.

TECHNICAL FIELD

The present disclosure relates to a localization system. Furthermore, the present disclosure relates to a corresponding method of operating a localization system, and to a computer program for carrying out said method.

BACKGROUND

Ultra-wideband (UWB) communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e., for determining the distance between communicating devices. Therefore, UWB technology may be used to advantage in various applications, such as automotive applications.

SUMMARY

In accordance with a first aspect of the present disclosure, a localization system is provided, comprising: a plurality of ultra-wideband (UWB) communication nodes; a plurality of antennas, each one of said antennas being included in one of said UWB communication nodes; an antenna selection unit configured to select a subset of said antennas for use in ranging operations that output a position estimate of an external device; wherein the antenna selection unit is configured to select said subset in dependence on at least one previous ranging operation.

In one or more embodiments, the antenna selection unit is configured to select said subset in dependence on the position estimate output by the previous ranging operation.

In one or more embodiments, the antenna selection unit is configured to select said subset in dependence on one or more channel quality indicators output by the previous ranging operation.

In one or more embodiments, the antenna selection unit is configured to select said subset by retrieving a predefined subset of antennas from a lookup table, wherein said lookup table maps predefined outputs of the previous ranging operation to predefined subsets of antennas.

In one or more embodiments, the predefined outputs of the previous ranging operation include estimations of an area in which the external device is located.

In one or more embodiments, the antenna selection unit is configured to select said subset by executing a predefined function that maps the output of the previous ranging operation to a preselected subset of antennas.

In one or more embodiments, the antenna selection unit is configured to select said subset by executing a machine learning algorithm that outputs said subset based on the output of the previous ranging operation.

In one or more embodiments, the machine learning algorithm has been trained to select the subset such that errors occurring in the ranging operations are below a predefined threshold.

In one or more embodiments, the localization system further comprises a localization unit configured to perform said ranging operations, wherein the antenna selection unit is included in said localization unit.

In one or more embodiments, the localization system further comprises a localization unit configured to perform said ranging operations, wherein the antenna selection unit is separate from said localization unit.

In one or more embodiments, the UWB communication nodes are UWB anchors comprised in or attached to a vehicle.

In accordance with a second aspect of the present disclosure, a method of operating a localization system is conceived, comprising: selecting, by an antenna selection unit included in the localization system, a subset from a plurality of antennas, said subset being for use in ranging operations that output a position estimate of an external device, wherein each one of said plurality of antennas is included in one of a plurality of ultra-wideband (UWB) communication nodes included in the localization system; selecting, by the antenna selection unit, said subset in dependence on at least one previous ranging operation.

In one or more embodiments, the antenna selection unit selects said subset in dependence on the position estimate output by the previous ranging operation.

In one or more embodiments, the antenna selection unit selects said subset in dependence on one or more channel quality indicators output by the previous ranging operation.

In accordance with a third aspect of the present disclosure, a computer program is provided, comprising computer-executable instructions that, when executed by a localization system, cause said localization system to carry out a method of the kind set forth.

DESCRIPTION OF DRAWINGS

Embodiments will be described in more detail with reference to the appended drawings.

DESCRIPTION OF EMBODIMENTS

Figure 1:
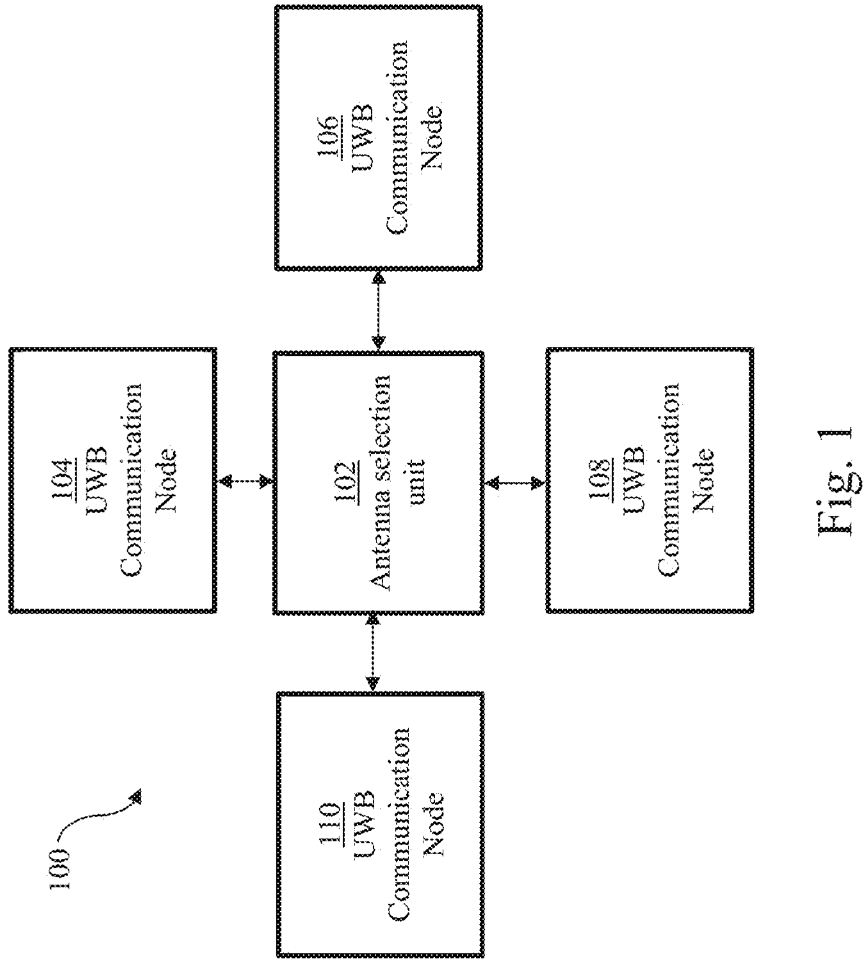
FIG. 1 shows an illustrative embodiment of a localization system.

As mentioned above, UWB communication technology is a technology that uses a high signal bandwidth, in particular for transmitting digital data over a wide spectrum of frequency bands with very low power. For example, UWB technology may use the frequency spectrum of 3.1 to 10.6 GHz and may feature a high-frequency bandwidth of more than 500 MHz and very short pulse signals, potentially capable of supporting high data rates. The UWB technology enables a high data throughput for communication devices and a high precision for the localization of devices. In particular, UWB technology may be used for so-called ranging operations, i.e., for determining the distance between communicating devices. Therefore, UWB technology may be used to advantage in various applications, such as automotive applications.

Real-time localization systems include so-called "anchors" which are placed at fixed positions in a given environment (e.g., a car, a building or a room) and mobile nodes which are often referred to as "tags". Using radio technology, a tag can determine its position relative to the available anchors. In many applications the tag's orientation relative to the environment and anchors is arbitrary and cannot be controlled. For applications in which tags are carried by human beings, the influence of the human body on the wave propagation between the tags and the anchors is significant. Nevertheless, these applications demand that the ranging and localization performance is not negatively affected by the position (e.g., front pocket, back pocket or handbag) and orientation (i.e., rotation in space) of the tags. In real environments these systems should cope with multipath propagation and antenna detuning, which may cause a significant variance in the distance estimates.

This effect may be mitigated by using multiple antennas on the anchors and/or tags. Since the size restrictions for mobile tags are stricter than for anchors, solutions using antenna diversity on the anchors are preferred. One way to use the available antennas is to perform distance measurements over all the antennas at every ranging interval. However, this approach may result in a high-power consumption and airtime. It is noted that a longer airtime increases the interference to other systems. Thus, a better strategy would be to only use the antenna that yields the most accurate distance estimate. In typical communication systems the antenna resulting in the highest received power may be selected. However, the goal of antenna diversity for ranging and localization is not to select the antenna that results in the highest signal-to-noise ratio, but the antenna delivering the most accurate ranging result. Therefore, applying strategies known from other communication systems to ranging systems may result in a poor performance.

Now discussed are a localization system and a corresponding method of operating a localization system, which facilitate selecting a suitable antenna from a plurality of antennas that may be used for ranging and localization operations.

FIG. 1 shows an illustrative embodiment of a localization system 100. The system comprises a plurality of UWB communication nodes 104, 106, 108, 110 and a plurality of antennas (not shown). Each one of these antennas is included in one of the UWB communication nodes 104, 106, 108, 110. Furthermore, the system 100 includes an antenna selection unit 102 which is operatively coupled to the UWB communication nodes 104, 106, 108, 110. The antenna selection unit 102 is configured to select a subset of the antennas for use in ranging operations that output a position estimate of an external device (not shown). More specifically, the antenna selection unit 102 is configured to select said subset in dependence on at least one previous ranging operation performed by the localization system. In this way, the selection of one or more suitable antennas is facilitated. In particular, by selecting the subset of antennas in dependence on at least one previous ranging operation, the likelihood that a more accurate ranging result will be delivered may be increased. Still, the power consumption and airtime may be reduced, because not all the antennas need to be used.

In one or more embodiments, the antenna selection unit is configured to select said subset in dependence on the position estimate output by the previous ranging operation. In this way, the selection of one or more suitable antennas is further facilitated. In particular, the position estimate output by the previous ranging operation may be indicative of the likely position of the external objects, such that one or more antennas may be selected that are directed towards this likely position. For example, the position estimate may be indicative of a likely area in which the external object is located, such that one or more antennas may be selected that are directed towards this likely area.

Furthermore, in one or more embodiments, the antenna selection unit is configured to select said subset in dependence on one or more channel quality indicators output by the previous ranging operation. In this way, the selection of one or more suitable antennas is further facilitated. In particular, in addition to a distance or position estimate, UWB-based ranging systems may deliver additional information about the communication channel (e.g., an estimated channel impulse response, received power and first path power). This information may be used in appropriate strategies to select the best fitting antenna in different situations. As tags move and the environmental situations change, these strategies may be able to adapt and always use the antenna resulting in the best possible ranging result, while maintaining a low power profile and minimum airtime. Especially in multipath environments (e.g., car cabins, crowded rooms and subway stations) these antenna selection strategies are key to obtain reasonable distance estimates and subsequently achieve a good localization accuracy.

In one or more embodiments, the antenna selection unit is configured to select said subset by retrieving a predefined subset of antennas from a lookup table, wherein said lookup table maps predefined outputs of the previous ranging operation to predefined subsets of antennas. This results in a practical implementation that is easy to realize. Furthermore, a suitable subset of antennas may be selected in an efficient manner (i.e., without a large computational effort), provided that the volume of interest is not too large. Furthermore, in one or more embodiments, the predefined outputs of the previous ranging operation include estimations of an area in which the external device is located. In this way, the size of the lookup table may be kept within reasonable limits, since a mapping may be provided for areas instead of individual position estimates, for example.

In one or more embodiments, the antenna selection unit is configured to select said subset by executing a predefined function that maps the output of the previous ranging operation to a preselected subset of antennas. In this way, the selection of one or more suitable antennas is further facilitated. For instance, if the volume of interest is large and a high resolution of the volume is needed (i.e., if tags should be localized with high precision within a large environment), using a predefined function may result in a more efficient implementation than a lookup table. Furthermore, in one or more embodiments, the antenna selection unit is configured to select said subset by executing a machine learning algorithm that outputs said subset based on the output of the previous ranging operation. In this way, the selection of one or more suitable antennas is further facilitated. In particular, a machine learning algorithm may enable a better selection of antennas, which further increases the likelihood that a more accurate ranging result will be delivered. In a practical implementation, the machine learning algorithm may have been trained to select the subset such that errors occurring in the ranging operations are below a predefined threshold.

In a practical implementation, the localization system further comprises a localization unit configured to perform said ranging operations, wherein the antenna selection unit is included in said localization unit. In another practical implementation, the localization system further comprises a localization unit configured to perform said ranging operations, wherein the antenna selection unit is separate from said localization unit.

Figure 2:
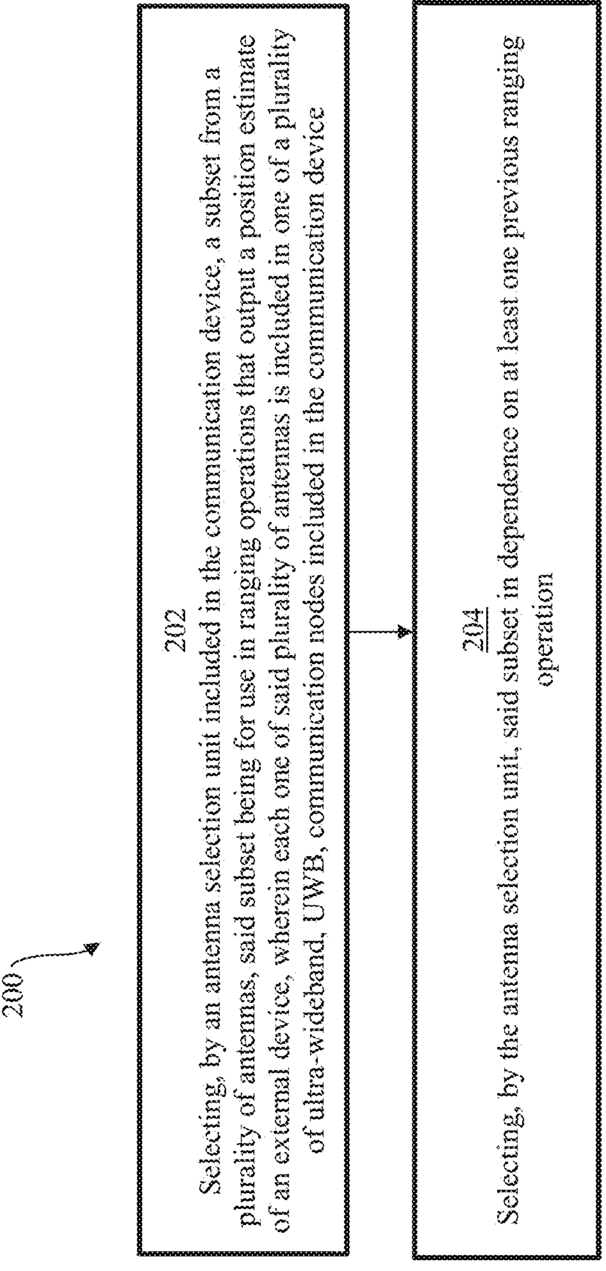
FIG. 2 shows an illustrative embodiment of a method of operating a localization system.

FIG. 2 shows an illustrative embodiment of a method 200 of operating a localization system. The method 200 comprises the following steps. At 202, an antenna selection unit included in the localization system selects a subset from a plurality of antennas, said subset being for use in ranging operations that output a position estimate of an external device, wherein each one of said plurality of antennas is included in one of a plurality of UWB communication nodes included in the localization system. Furthermore, at 204, the antenna selection unit selects said subset in dependence on at least one previous ranging operation. This method 200 facilitates the selection of one or more suitable antennas.

It is noted that an antenna selection unit of the kind set forth above may be included in a central localization engine of the localization system. Furthermore, the selection process may be based on the last position estimate of a mobile node (i.e., a tag). In particular, several techniques of different complexity may be used to decide which antenna should be used, based on a prior position estimate of the mobile node. For instance, one technique for deciding which antenna or antennas should be used is to pre-characterize the whole system and generate a lookup table which stores the antennas that should be used if the mobile node is estimated to be in a specific region. This method is straightforward, but as the environment has a strong impact on localization, the performance may degrade for environments different than the one used to generate the lookup table. Also, the lookup tables may become quite large if the volume of interest is large and a high resolution of the volume is needed.

Another technique for deciding which antenna or antennas should be used is to use a mathematical function or algorithm to derive the list of best suited antennas based on the last position estimate. For example, a handcrafted mathematical function or algorithm may be used, which may be based on experience of the designer or derived from measurement campaigns. Alternatively, a machine learning algorithm may be used. For example, a machine learning algorithm may be trained using measurements with all or subsets of antennas with a corresponding localization engine to produce the position estimate. How the localization engine is implemented is not of interest for this method. The localization engine takes data from the anchors and outputs a position estimate and possibly some quality indicators of the position estimate. The used antennas, position estimate and optional quality indicators are then used as training data to train a machine learning algorithm to pick the best set of antennas based on the previous position estimate with optional quality indicators and set of previously used antennas. It is noted that the best set of antennas may be interpreted as the set of antennas that minimizes the localization error for the next ranging round. Thus, in this implementation, the machine learning algorithm is executed separately from the localization method. Alternatively, a single machine learning algorithm may be used for the localization and the antenna decision task. For this purpose, the ranging data and possibly other channel information provided by the anchors, together with the set of previously used antennas, may be fed into the central localization algorithm. Then the algorithm may output a position estimate, again with optional quality indicators, and a set of antennas that should be used for the next measurement round. The set of antennas is again chosen to minimize the resulting localization error for the next measurement round.

In accordance with the present disclosure, a localization system may include multiple anchors, each one of which includes one or more antennas. The number of antennas may vary between the different anchors. The anchors are fixed nodes which form part of a localization infrastructure. This localization infrastructure may be a vehicle, such as a car, but also a room for indoor localization or any other localization infrastructure (e.g., for Internet of Things use cases). The anchors are typically able to perform ranging operations with mobile nodes. Furthermore, the result of ranging operations is typically a distance estimate as well as additional channel information. The output of the ranging operations may be communicated to a central localization engine. Furthermore, to reduce the amount of transmitted data, each anchor may apply pre-processing to the ranging results and/or only communicate the data really used by the localization engine. The localization engine may be a dedicated, individual node in the localization system. Alternatively, one of the anchors may take the role of a central anchor and also perform the task of the localization engine. Once the central node with the localization engine receives the ranging results from the anchors, a position estimate and the set of antennas for the next ranging round may be calculated. The output of the localization engine is a position estimate and optionally some quality indicators for the position estimate.

For the selection of the next set of antennas an algorithm or lookup table may be used that uses the output of a separate localization engine. Alternatively, a combined localization and antenna decision engine may calculate both the position estimate and the set of antennas to be used for the next ranging round. Thus, the decision on which antenna or antennas are used may be based on the output of the localization engine, or on the ranging results in case of a combined localization and antenna decision engine. Furthermore, the antenna selection may be implemented using a lookup table, a handcrafted mathematical function or algorithm or a machine learning algorithm. For example, for each region in the volume of interest an entry in a lookup table with a set of antennas may exist. If the last position estimate is inside a given region, the corresponding set of antennas from the lookup table is used for the next ranging round. It is noted that a system may contain different lookup tables to adapt to changing environmental conditions (e.g., a car parked on an open parking lot versus a car parked in a garage) if information about the environment is available.

Alternatively, a handcrafted mathematical function or algorithm may map the output of the localization engine, or in case of a combined localization and antenna decision engine the ranging results, to a set of antennas that should be used for the next ranging round. Similarly, a machine learning algorithm may map the output of the localization engine, or in case of a combined localization and antenna decision engine the ranging results, to a set of antennas that should be used for the next ranging round.

Figure 3:
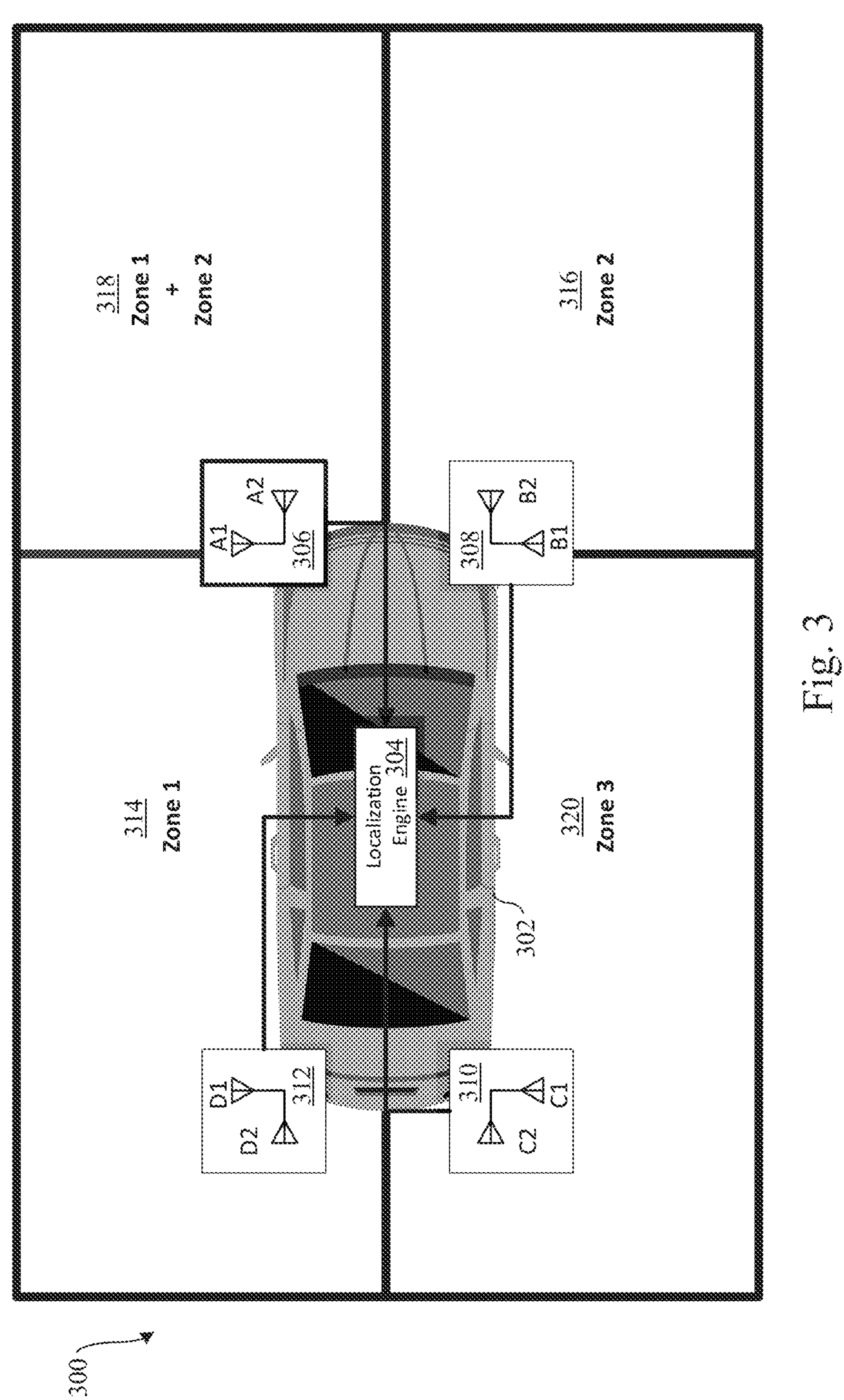
FIG. 3 shows another illustrative embodiment of a localization system.

FIG. 3 shows another illustrative embodiment of a localization system 300. In this example, the localization system 300 is integrated into a car 302. The localization system 300 includes a localization engine 304 which is implemented in a central node. In addition, the localization system 300 includes a plurality of anchor nodes 306, 308, 310, 312 which are operatively coupled to the localization engine 304. In this example, each of the anchor nodes 306, 308, 310, 312 includes two antennas for performing ranging operations. In operation, the localization engine 304 receives ranging results from the anchor nodes 306, 308, 310, 312 and estimates the position of a mobile node (not shown) based on said ranging results. Furthermore, in accordance with the present disclosure, an antenna selection unit (not shown) may select a subset of the eight available antennas in dependence on one or more previously performed ranging operations. It is noted that the antenna selection unit may be integrated with the localization engine 304, implemented as a separate node in the system, or integrated with one of the anchor nodes 306, 308, 310, 312.

It is noted that the embodiment shown in FIG. 3, which represents a relatively simple setup, may be realized using either a lookup table or a handcrafted algorithm. In this example, the localization system 300 has four anchors nodes 306, 308, 310, 312 (A to D) with two antennas (1 and 2) each. The antenna selection unit may select specific subsets of antennas in dependence on at least one previous ranging result. For instance, if the previous ranging result indicates that the mobile node is most likely located in a specific one of different predefined areas 314, 316, 318, 320, the antenna selection unit may select a subset of antennas which are directed towards said specific one of the predefined areas. More specifically, considering only the first anchor 306 (i.e., anchor A), if the last position estimate indicates that the mobile node is located in a first area 314 (corresponding to a first zone), then only antenna A1 may be used for the next ranging round, while antenna A2 is not used. However, if the last position estimate indicates that the mobile node is located in a second area 316 (corresponding to a second zone), then antenna A2 may be used for the next ranging round, while antenna A1 is not used. Furthermore, if the last position estimate indicates that the mobile node is located in a third area 318 (i.e., an area in which the first zone overlaps with the second zone), then both antennas A1 and A2 of the first anchor 306 may be used. Finally, if the last position estimate indicates that the mobile node is located in a fourth area 320 (corresponding to a third zone), none of the antennas of the first anchor 306 may be selected. It is noted that the selection of the antennas of the other anchor nodes 308, 310, 312 may be performed in a similar manner. For instance, if the last position estimate indicates that the mobile node is located in the first area 314, then both antennas of the fourth anchor node 312 (i.e., antennas D1 and D2) may be selected, in addition to antenna A1 of the first anchor node 306. Furthermore, different zones may be defined for each of the anchor nodes 306, 308, 310, 312, as well as different antenna selection criteria. Furthermore, if the last position estimate indicates that the mobile node is located in the fourth area 320, then none of the antennas of the first anchor 306 may be selected, but antennas of other anchor nodes (e.g., the first antenna B1 of the second anchor node 308 and both antennas C1, C2 of the third anchor node 310) may be selected. The system design may ensure that enough ranging operations are carried out to provide a minimum amount of ranging results for proper operation of the localization engine 304.

It is noted that not all scenarios may be as simple as the scenario shown in FIG. 3. To handle more complex scenarios, machine learning may be used. In that case, measurement data from different scenarios may be gathered to train the machine learning algorithm. To generate appropriate training data, the antenna selection unit may select all available antennas to generate ranging results. To conclude the training, either all the data from all antennas may be provided to the machine learning algorithm, or only the results of specific antenna sets, or alternating antenna sets, to simulate the behavior of the final system. Which of these approaches result in better system performance depends on the use case and availability of training data and should be verified by the system designer. In case of a separated localization and antenna decision engine, the machine learning algorithm implemented in the antenna decision engine may receive the position estimate with optional quality indicators and the last set of used antennas as input. In case of a combined localization and antenna decision engine, the machine learning algorithm may receive the ranging results, which contain the distance estimate and optional additional channel information, and the last set of used antennas as input. The output of the antenna decision engine is a set of antennas that should be used for the next ranging round. The machine learning algorithm is trained to minimize the ranging error for the next measurement round by choosing the appropriate set of antennas. It is noted that the localization accuracy depends on the ranging accuracy of the individual anchors and the used antennas. Therefore, the algorithm may also aim at minimizing the individual ranging errors of the anchors and antennas.

A more detailed example of a localization process may contain the following steps. For a first ranging round no prior position estimate is available. Therefore, the first ranging round may use a predetermined set of antennas. For instance, a suitable predetermined set includes at least one antenna on each anchor. Alternatively, all the available antennas may be used for the initial ranging round. Then, the ranging results obtained during the first ranging round may be provided to a central node (e.g., a node containing a localization engine and antenna decision engine). The next step, i.e., the localization/ranging operation and antenna selection, may be performed in different ways, depending on the implementation of the system. For instance, if the localization engine and antenna decision engine are separated, then the localization engine may first calculate the position estimate and optional quality indicators, and then the antenna decision engine may calculate the set of antennas that should be used for the next ranging round. Alternatively, if the localization engine and antenna decision engine are one combined block, then this combined localization engine and antenna decision engine may calculate the position estimate with optional quality indicators as well as the set of antennas for the next ranging round. Next, each anchor may be informed about which antennas should be used for the next ranging round. It is noted that if no antenna of an anchor is selected, then this anchor will not be used at all for the next ranging round. Subsequently, ranging operations may be performed using only the calculated set of antennas (i.e., the selected subset of antennas). Next, the localization process may provide the newly obtained ranging results to the central node, after which another antenna selection and subsequent localization/ranging may be performed following the above-described steps, until the localization process is aborted. It is noted that the localization process may be aborted for various reasons, depending on the use case. For example, the abortion may be triggered by user interaction, or by the completion of a task for which the localization was needed (e.g., a target was reached), or by the fact that a mobile node is no longer available (e.g., because it is out of range or disabled).

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 localization system
102 antenna selection unit
104 UWB communication node
106 UWB communication node
108 UWB communication node
110 UWB communication node
200 method of operating a localization system
202 selecting, by an antenna selection unit included in the localization system, a subset from a plurality of antennas, said subset being for use in ranging operations that output a position estimate of an external device, wherein each one of said plurality of antennas is included in one of a plurality of ultra-wideband, UWB, communication nodes included in the localization system
204 selecting, by the antenna selection unit, said subset in dependence on at least one previous ranging operation
300 localization system
302 vehicle
304 localization engine
306 first UWB anchor
308 second UWB anchor
310 third UWB anchor
312 fourth UWB anchor
314 first area
316 second area
318 third area
320 fourth area

The invention claimed is:

1. A localization system, comprising:
a plurality of ultra-wideband, UWB, communication nodes;
a plurality of antennas, each one of said antennas being included in one of said UWB communication nodes;
an antenna selection unit configured to select a subset of said antennas for use in ranging operations that output a position estimate of an external device;
wherein the antenna selection unit is configured to select said subset in dependence on at least one previous ranging operation.

2. The localization system of claim 1, wherein the antenna selection unit is configured to select said subset in dependence on the position estimate output by the previous ranging operation.

3. The localization system of claim 1, wherein the antenna selection unit is configured to select said subset in dependence on one or more channel quality indicators output by the previous ranging operation.

4. The localization system of claim 1, wherein the antenna selection unit is configured to select said subset by retrieving a predefined subset of antennas from a lookup table, wherein said lookup table maps predefined outputs of the previous ranging operation to predefined subsets of antennas.

5. The localization system of claim 4, wherein the predefined outputs of the previous ranging operation include estimations of an area in which the external device is located.

6. The localization system of claim 1, wherein the antenna selection unit is configured to select said subset by executing a predefined function that maps the output of the previous ranging operation to a preselected subset of antennas.

7. The localization system of claim 1, wherein the antenna selection unit is configured to select said subset by executing a machine learning algorithm that outputs said subset based on the output of the previous ranging operation.

8. The localization system of claim 1, wherein the machine learning algorithm has been trained to select the subset such that errors occurring in the ranging operations are below a predefined threshold.

9. The localization system of claim 1, further comprising a localization unit configured to perform said ranging operations, wherein the antenna selection unit is included in said localization unit.

10. The localization system of claim 1, further comprising a localization unit configured to perform said ranging operations, wherein the antenna selection unit is separate from said localization unit.

11. The localization system of claim 1, wherein the UWB communication nodes are UWB anchors comprised in or attached to a vehicle.

12. A method of operating a localization system, comprising:

selecting, by an antenna selection unit included in the localization system, a subset from a plurality of antennas, said subset being for use in ranging operations that output a position estimate of an external device, wherein each one of said plurality of antennas is included in one of a plurality of ultra-wideband, UWB, communication nodes included in the localization system;

selecting, by the antenna selection unit, said subset in dependence on at least one previous ranging operation.

13. The method of claim 12, wherein the antenna selection unit selects said subset in dependence on the position estimate output by the previous ranging operation.

14. The method of claim 12, wherein the antenna selection unit selects said subset in dependence on one or more channel quality indicators output by the previous ranging operation.

15. A non-transitory computer readable medium comprising a computer program stored in the non-transitory computer readable medium, the computer program comprising computer-executable instructions that, when executed by a localization system, cause said localization system to carry out operations comprising:

selecting, by an antenna selection unit included in the localization system, a subset from a plurality of antennas, said subset being for use in ranging operations that output a position estimate of an external device, wherein each one of said plurality of antennas is included in one of a plurality of ultra-wideband, UWB, communication nodes included in the localization system;

selecting, by the antenna selection unit, said subset in dependence on at least one previous ranging operation.

16. The localization system of claim 4, wherein the antenna selection unit is configured to select said subset in dependence on the position estimate output by the previous ranging operation.

17. The localization system of claim 4, wherein the antenna selection unit is configured to select said subset in dependence on one or more channel quality indicators output by the previous ranging operation.

18. The localization system of claim 2, further comprising a localization unit configured to perform said ranging operations, wherein the antenna selection unit is included in said localization unit.

19. The localization system of claim 2, further comprising a localization unit configured to perform said ranging operations, wherein the antenna selection unit is separate from said localization unit.

20. The localization system of claim 2, wherein the UWB communication nodes are UWB anchors comprised in or attached to a vehicle.

* * * * *